United States Patent [19]

Bohman et al.

[11] 4,376,609

[45] Mar. 15, 1983

[54] AUTOMATIC SPOUT CONTROL FOR AGRICULTURAL MACHINES

[75] Inventors: Carl E. Bohman, New Holland, Pa.; Hugh C. Maguire, Westford; Bradley J. Thompson, Maynard, both of Mass.

[73] Assignee: Sperry Corporation, New York, N.Y.

[21] Appl. No.: 135,949

[22] Filed: Mar. 31, 1980

[51] Int. Cl.³ ............................................. B65G 67/22
[52] U.S. Cl. .................................. 414/335; 356/138; 356/153
[58] Field of Search ............... 414/335; 250/231 SE; 356/138, 152, 153, 155

[56] References Cited

U.S. PATENT DOCUMENTS

| | | | |
|---|---|---|---|
| 2,557,219 | 6/1951 | Flint et al. | 256/138 |
| 3,105,381 | 10/1963 | Collette | 356/138 |
| 3,754,815 | 8/1973 | Sanctuary et al. | 250/231 SE |
| 3,786,945 | 1/1974 | Symonds | 414/335 |
| 3,877,816 | 4/1975 | Weiss et al. | 356/138 |
| 4,042,132 | 8/1977 | Bohman et al. | 414/335 |

*Primary Examiner*—Lawrence J. Oresky
*Attorney, Agent, or Firm*—Howard P. Terry

[57] ABSTRACT

The crop discharge spout of an agricultural machine is continuously adjusted so that the crop material discharge therefrom is always directed into an associated, but not necessarily connected, collector vehicle. An electro optical device affixed to the crop discharge spout illuminates a scanning area with an optical signal. A passive retroreflective target affixed to the collector vehicle and disposed within the scanning area reflects the optical signal back to the electro optical device. The electro optical device receives the reflected optical signal and causes logic means to generate control signals, such that appropriate utilization means aligns the crop discharge spout with the associated but not necessarily attached collector vehicle.

10 Claims, 15 Drawing Figures

AUTOMATIC SPOUT CONTROL FOR AGRICULTURAL MACHINES

BACKGROUND OF THE INVENTION

1. Field of the Invention

This invention relates to agricultural machines and, more particularly, to an apparatus for automatically regulating a discharge spout thereon with respect to an associated but not necessarily attached collector vehicle.

2. Description of the Prior Art

Various agricultural machines include a discharge spout cooperating therewith to direct material into a collector vehicle or storage tank. In some machines, the discharge spout is stationary and the associated vehicle cooperates with the machine and spout to collect the crop material. There are, however, agricultural machines having adjustable discharge spouts, from which harvested crop or other material is directed into a storage wagon, a truck following the agricultural machine, or a stationary storage tank. It is apparent, when maneuvering around corners during harvesting, that it becomes necessary to redirect the discharge spout such that the harvested crop is continually directed into the associated collector vehicle. For efficient operation, crop loss must be kept to an absolute minimum. Traditionally, the operator performed this task by manually aligning the discharge spout with a crank or by actuating a switch that controlled a bidirectional electromechanical unit suitably coupled to the discharge spout.

More recently, however, automatic spout control systems have appeared. One such system employs a completely mechanical means for positioning the discharge spout in response to the movement of a wagon coupled thereto. Another such system is described in U.S. Pat. No. 3,786,945 entitled "Spout Control System" issued to Dean Symonds. The Symonds patent discloses an "active target" system having a large coil of wire associated with the wagon which is energized with an alternating current to produce a magnetic field. A signal coil mounted on the discharge spout, having its axis perpendicular to the axis of the large coil, couples energy between the coils to a phase detecting circuit. The output from the phase detecting circuit is utilized to position the spout accordingly. A more recent device described in U.S. Pat. No. 4,042,132 entitled "Spout Control Apparatus for Agricultural Machines," is assigned to the assignee of the instant application. This device includes a first sensor, a potentiometer disposed on the agricultural machine and coupled through a mechanical follower to the trailing wagon, and a second sensor coupled through appropriate gearing to the discharge spout. Thus, the device detects two angles, the angle of the wagon relative to the harvesting machine and the angle of the direction of the crop discharge spout. The outputs of the sensors which are signals representative of the two angles are coupled to a comparator, whereby an error signal is generated to adjust the discharge spout until the difference between the two angles is substantially reduced to zero.

Accordingly, the traditional methods of manual operation are limited by their inherent inefficiency and the safety hazards which they pose as the operator's attention is split between the operation of the agricultural machine and the operation of the spout. Furthermore, the described prior art automatic methods are expensive, limit the mechanical design of the agricultural machine, and require the physical coupling of the agricultural machine to the collector, i.e., wagon, truck, or tank. Therefore, there is a need to provide the agricultural industry with a solution to the problem of spout control or remote positioning of other components such that efficient operation of the agricultural machine may be had when utilizing an associated, but not necessarily attached, collector vehicle.

SUMMARY OF THE INVENTION

These difficulties are overcome, to a large extent, through the practice of this invention. Illustratively, the discharge spout is provided with an electro-optical device having a transmitter-receiver means to detect the relative angular position of the collector vehicle with respect to the spout and to automatically position the spout towards the collector vehicle such that efficient operation and reduced crop loss may be achieved.

Specifically, the apparatus of this invention includes transmitter means for scanning a passive retroreflective target affixed to the collector vehicle with energy of a particular pulse repetition frequency, and receiver means associated therewith for producing an output signal indicative of a return of an energy pulse from the target. The apparatus further includes position detector means, for producing a left or right direction signal for the discharge spout and a dead zone signal indicative of alignment of the discharge spout with the passive target. The output signal and the position detector signal are coupled to control logic means responsive thereto for enabling the logic means to provide an appropriate, left or right, control signal. These control signals energize a bidirectional d.c. motor coupled to the spout through appropriate gearing to align the spout with the passive target affixed to the collector vehicle. This control logic means is also responsive to the dead zone signals, which if activated, cause the apparatus to disregard the output signal of the receiver means and thereby minimize the oscillation of the spout when the spout is appropriately aligned with the passive target.

More specifically, the transmitter means of this invention is an optical transmitter and preferably includes a light emitting diode mounted at the center of a lens, wherein the lens forms a portion of the receiver means. The receiver means preferably includes a phototransistor responsive to the primary optical wavelength of the light emitting diode and disposed at the focal point of the lens. The present invention further includes an inclined rotating reflective surface or scanning mirror towards which the optical signals from the light emitting diode are directed, or some other on-axis or beam splitting application may be utilized. The reflected optical signals scan the target area, i.e., they are reflected from the mirror in a circular scanning pattern in response to the rotation of the mirror. The optical scanning signals strike the retroreflective target and are reflected back to the mirror where the lens focuses them onto the receiver's phototransistor. The receiver then produces an output signal indicative of the target's presence within the scanning area.

In one embodiment of the invention the position detector means includes a timing disk affixed to the revolving mirror and includes opaque and transparent portions which cause associated light sources and electronic circuitry having photosensitive sensors to generate left or right direction signals or dead zone signals. Whereas, in a further embodiment of the invention the position detector means includes a first phototransistor, responsive to the optical scanning signal, to initiate a signal to enable the receiver circuitry and a second phototransistor, responsive to the optical transmitted signal, to disable the receiver circuitry. These enabling and disabling signals are coupled to appropriate logic circuitry and the angular position of rotating mirror is determined therewith, such that an efficient position detector results therefrom.

DESCRIPTION OF THE PREFERRED EMBODIMENT

Figure 1:
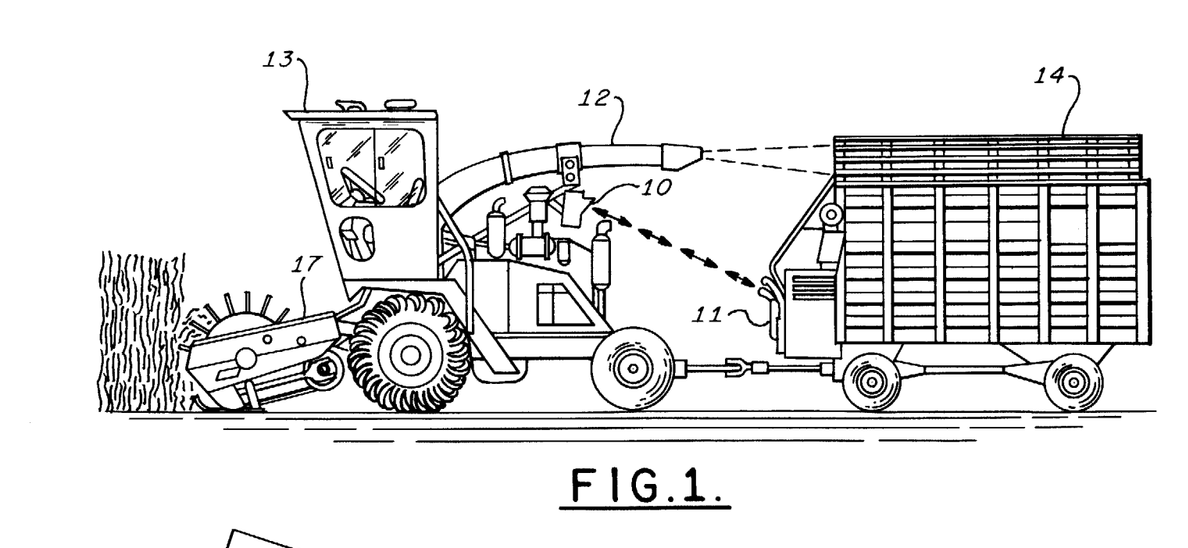
FIG. 1 is an illustration depicting a typical agricultural machine, such as a self-propelled forage harvester utilizing the apparatus of the present invention and having a storage wagon trailing thereafter.

Referring now to FIG. 1, an illustration of an agricultural machine 13 having a crop discharge spout 12 and an associated collector vehicle 14 is depicted. The present invention which includes an electro-optical device 10 and a retroreflective target 11, is depicted with the electro-optical device 10 affixed to the crop discharge spout 12 and with the passive target 11 affixed to the collector vehicle 14. The present invention further includes utilization means (not shown) having a bidirectional d.c. motor and suitable gearing which is coupled to the crop discharge spout 12.

Figure 1A:
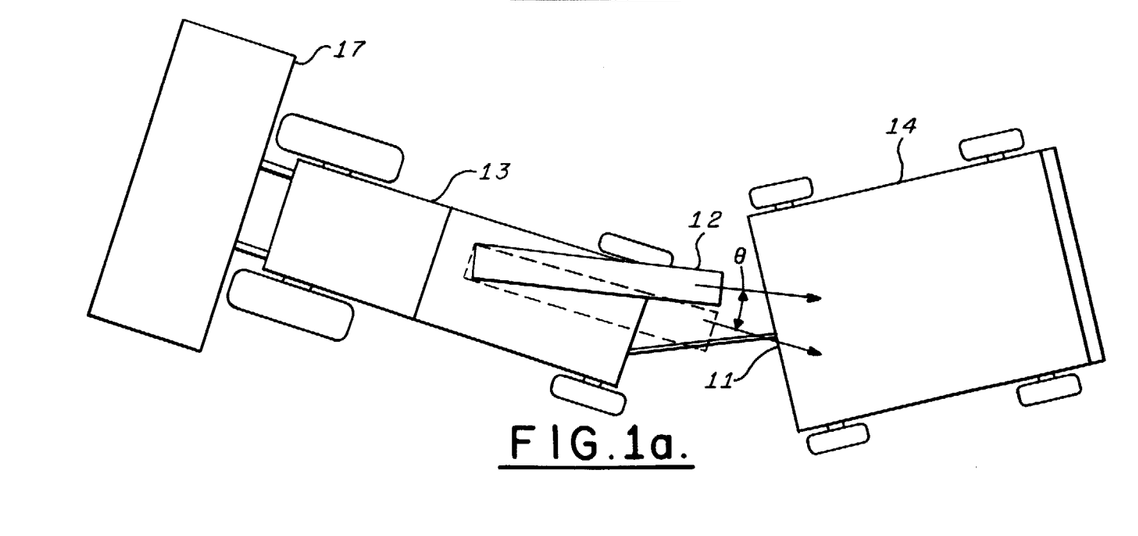
FIG. 1A is the block diagram of the forage harvester and wagon illustrating the angular relationship between the discharge spout mounted on the harvester and the passive target affixed to the wagon as shown in FIG. 1.

Referring now to FIG. 1A, a block diagram of the agricultural machine 13 and the collector vehicle 14 is depicted. The crop discharge spout 12 mounted on the agricultural machine 13 is directed towards the collector vehicle 14 and is displaced away from the passive target 11 by an offset angle $\theta$. The dashed lines in FIG. 1A depict a position that would align the crop discharge spout 12 exactly with the passive target 11. The exact alignment of the crop discharge spout 12 with the passive target 11 may often result in a less than optimum transfer of the discharge crop to the collector vehicle 14. Thus, depending upon the hitch points used to couple the agricultural machine 13 to the collector vehicle 14, the crop discharge spout 14 may have to be offset by an angle $\theta$ to insure maximum transfer of the crop material to the collector vehicle 14. The crop material or forage is harvested by the header assembly 17 and fed to the discharge spout 12 from which it is discharged at sufficient velocity to carry it into the collector vehicle 14. From the illustrations in FIGS. 1 and 1A, it can be appreciated that when the operator is maneuvering the harvester around corners, etc. the discharge spout 12 must be adjusted accordingly in order to insure the harvested forage is directed properly to within the collector vehicle 14.

Figure 2:
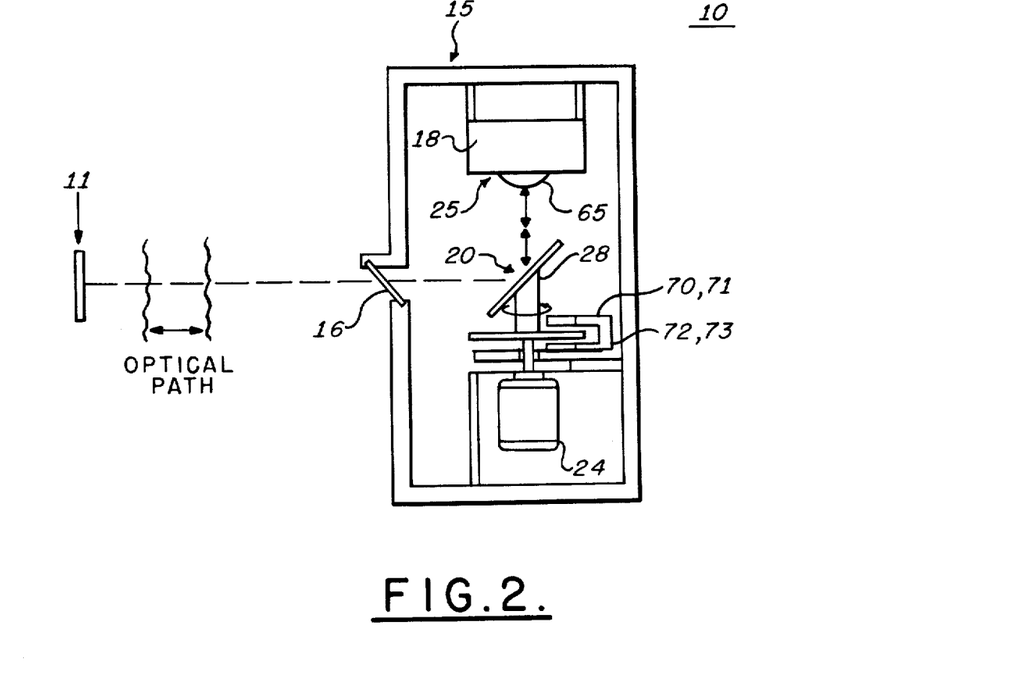
FIG. 2 illustrates a sectional view of a preferred embodiment of an electro-optical device and a retroreflective target utilized in the present invention.

Referring now to FIG. 2, an enlarged illustration of the electro-optical device 10 and the retroreflective target 11 is depicted. The optical sensor 10 is contained within a housing 15 which has a viewing window 16. An electronic transmitter/receiver housing 18 is affixed to the housing 15. The electronic transmitter/receiver housing 18 includes a planoconvex lens 25 having an associated light emitting diode 65 preferably mounted in its center. The light emitting diode 65 preferably emits an optical signal having an infrared wavelength. The light emitting diode 65 is aligned with an inclined reflective surface 20 affixed to a rotating shaft 28, and the optical signal emitted from the light emitting diode 65 is reflected off the rotating reflective surface 20 causing the optical signal to irradiate from the reflective surface 20 in a circular scanning pattern. The optical signal passes through the viewing window 16 and strikes the retroreflective target 11 when the target is in the path of the scanning optical signal. The retroreflective target 11 is preferably comprised of at least one reflector having a plurality of cubical corners on its surfaces. Such reflectors are well known in the art and commonly used as bicycle reflectors. The optical signal is, thus, reflected off the retroreflective target 11 and directed back toward the rotating reflective surface 20, whereupon the retroreflected optical signal is reflected upwards to the planoconvex lens 25. An electric motor 24 is affixed to the housing 15 and operatively coupled to the rotating shaft 28 which drives the inclined rotating reflector surface 20. A timing disk 21 is also affixed to the rotating shaft 28, and the timing disk 21 rotates between the light sources 70, 71 and electronic logic circuitry having phototransistor means 72, 73.

Figure 2A:
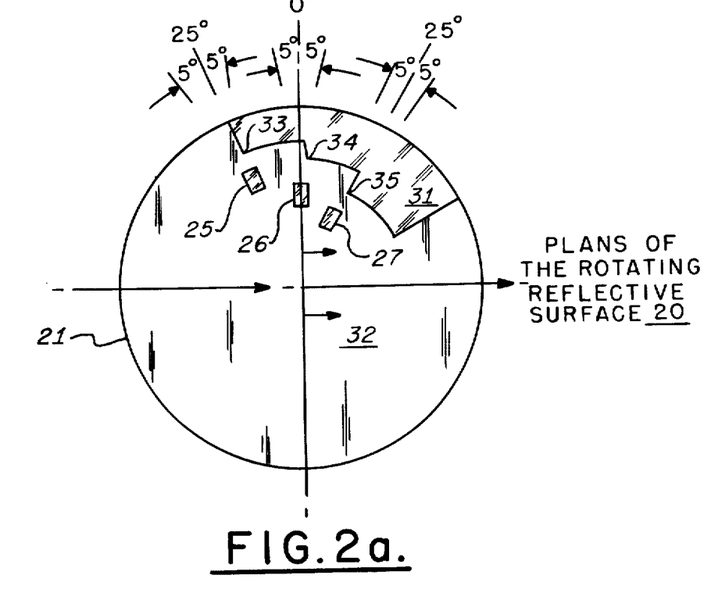
FIG. 2A is an illustration of a timing disk included in the preferred embodiment of the electro-optical device.

Referring now to FIG. 2A, an enlarged view of a timing disk 21 is illustrated. The timing disk 21 includes a generally inner circular portion 32 that is opaque and an outer portion 31 that is transparent. The timing disk may be constructed out of an opaque disk having cut outs, but it is preferably constructed out of a transparent material having masked opaque portions. The boundary between the outer transparent portion 31 and the inner opaque portion 32 may be relatively defined as the center of the rotating reflector surface 20, and the comparison points 33, 34, and 35 may be used to define left and right zones. These comparison points 33, 34 and 35 may be typically located at $-25°$, $0°$, and $+25°$ relative to the plane of the rotating reflective surface 20. The timing disk 21 further includes transparent sections 25a, 26 and 27 which may also be located at relative angular displacements of the comparison points 33, 34, and 35. These transparent sections 25a, 26, 27 are defined as dead zones which will be hereinafter described. The operation and design of the timing disk 21 is quite similar to optical shaft position encoders which are well known in the art and commonly utilized as shaft angle analog to digital converters.

Figure 3:
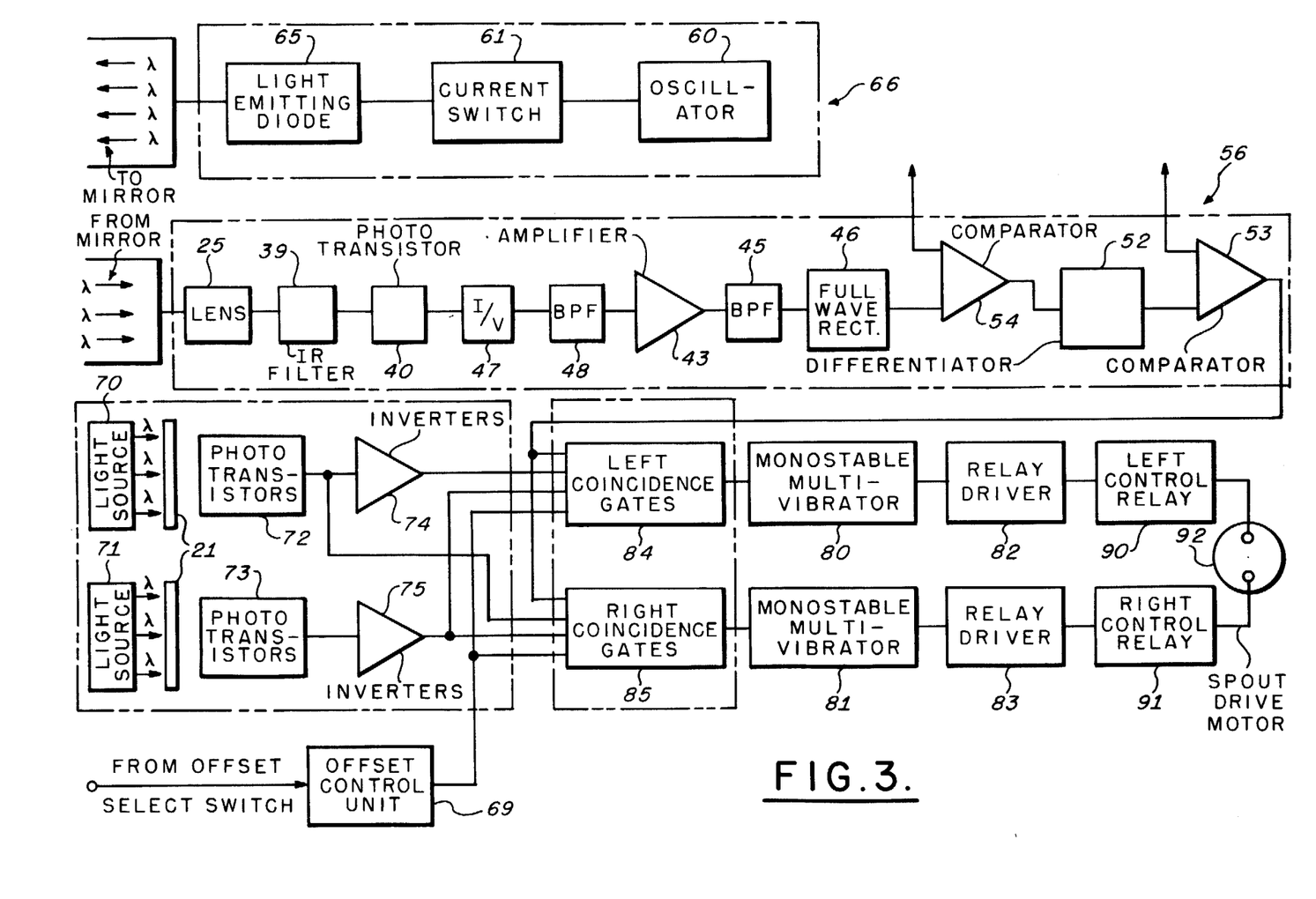
FIG. 3 is a functional block diagram of the electronic circuitry utilized in the preferred embodiment.

Referring now to FIG. 3, a functional block diagram of the electronic circuitry utilized in the preferred embodiment is depicted. An optical transmitter 66 is comprised of the infrared light emitting diode 65 coupled to an oscillator 60 via the current switch 61. The oscillator 60 preferably includes an astable multivibrator for generating a square wave signal to drive the light emitting diode 65. The optical receiver 56 includes a planoconvex lens 25 which receives the reflected infrared light emitted by the light emitting diode 65. A low pass infrared filter 39 is preferably mounted on the flat rearward portion of the planoconvex lens 25.

As depicted in the block diagram, FIG. 3, the planoconvex lens 25 focuses reflected infrared light onto a phototransistor 40 which preferably is resistively loaded and operating at a resting bias point as a result of ambient illumination, such that when a modulated light signal, i.e., the reflected infrared light, is applied, an output voltage is produced at the collector of the phototransistor 40. Referring now to FIG. 3D, a graphic representation of the voltage-current, output voltage-time, and ambient illumination-time characteristics for the phototransistor 40 is provided. A resting point P of the phototransistor 40 is depicted upon the voltage-current plot. As the ambient illumination increases, the resting point $P_1$ to $P_1'$ moves to a point P'; and if the modulated light signal is applied, the output voltage decreases on the output voltage-time plot. This problem is further aggravated if a large value resistor is used to load the phototransistor 40 and is chosen to maximize sensitivity, since a small shift in ambient light causes a large excursion in the bias point, which results in saturation of the phototransistor 40, and a decrease in sensitivity. Therefore, two conflicting conditions exist, i.e., a low-load resistance is needed to provide a stable bias point, but a high value of load resistance is needed for good sensitivity.

Figure 3A:
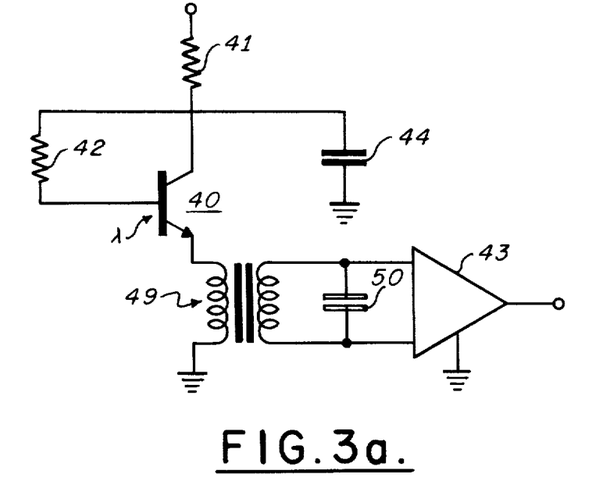
FIGS. 3A, 3B, and 3C are schematic diagrams illustrating selected function blocks depicted in FIG. 3.

Referring now to FIG. 3A, it can be appreciated that the schematic of a circuit having the phototransistor stage depicted therein, provides a solution of the two conflicting conditions. The circuit is comprised of a bias resistor 42, a decoupling resistor 41, a capacitor 44, the phototransistor 40, and a step-up transformer 49 which are coupled together to form the phototransistor stage. The step-up transformer 49 may have its low resistance winding coupled between the phototransistor's 40 emitter and ground, and its high impedance winding may be coupled to a high impedance buffer amplifier 43. Referring again to FIG. 3D, it can be seen that since the step-up transformer's 49 d.c. resistance is low, the input winding of the transformer 49 provides a steeply sloping load line $-(1/R_L)$ on the voltage-current plot in FIG. 3D. Therefore, increasing ambient illumination, causes the operating point of the transistor to move from a point P to P' on the voltage-current plot, and causes only a small d.c. output voltage shift on the output voltage-time plot.

Figure 3B:
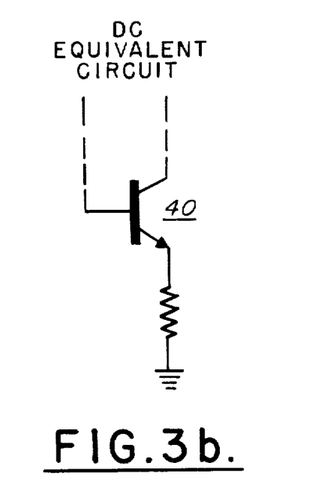

Referring now to FIG. 3B, if the modulated light signal is applied to phototransistor 40 as shown in the equivalent d.c. circuit, the phototransistor produces an a.c. emitter current in response to the light. The current is applied to the low impedance winding of the transformer 49, and the high impedance secondary winding produces a large voltage excursion as a result of the step-up turns ratio of the transformer. This response is analogous to that of a current transformer as used in a.c. power measuring equipment, or it may be considered as a "current to voltage" converter.

Figure 3C:
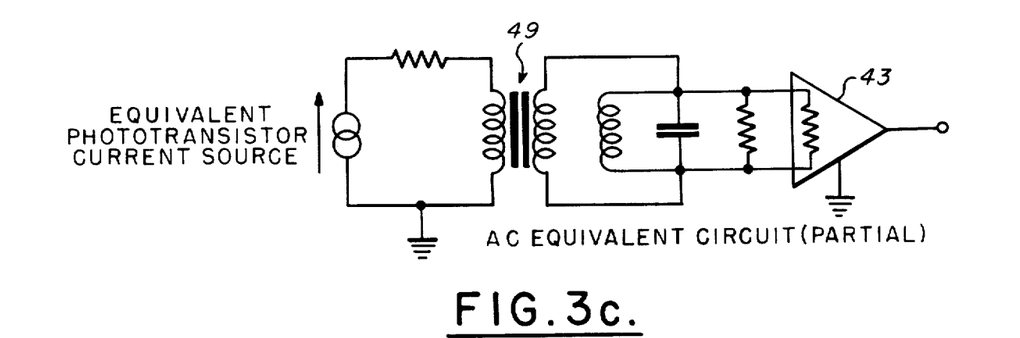
Figure 3D:
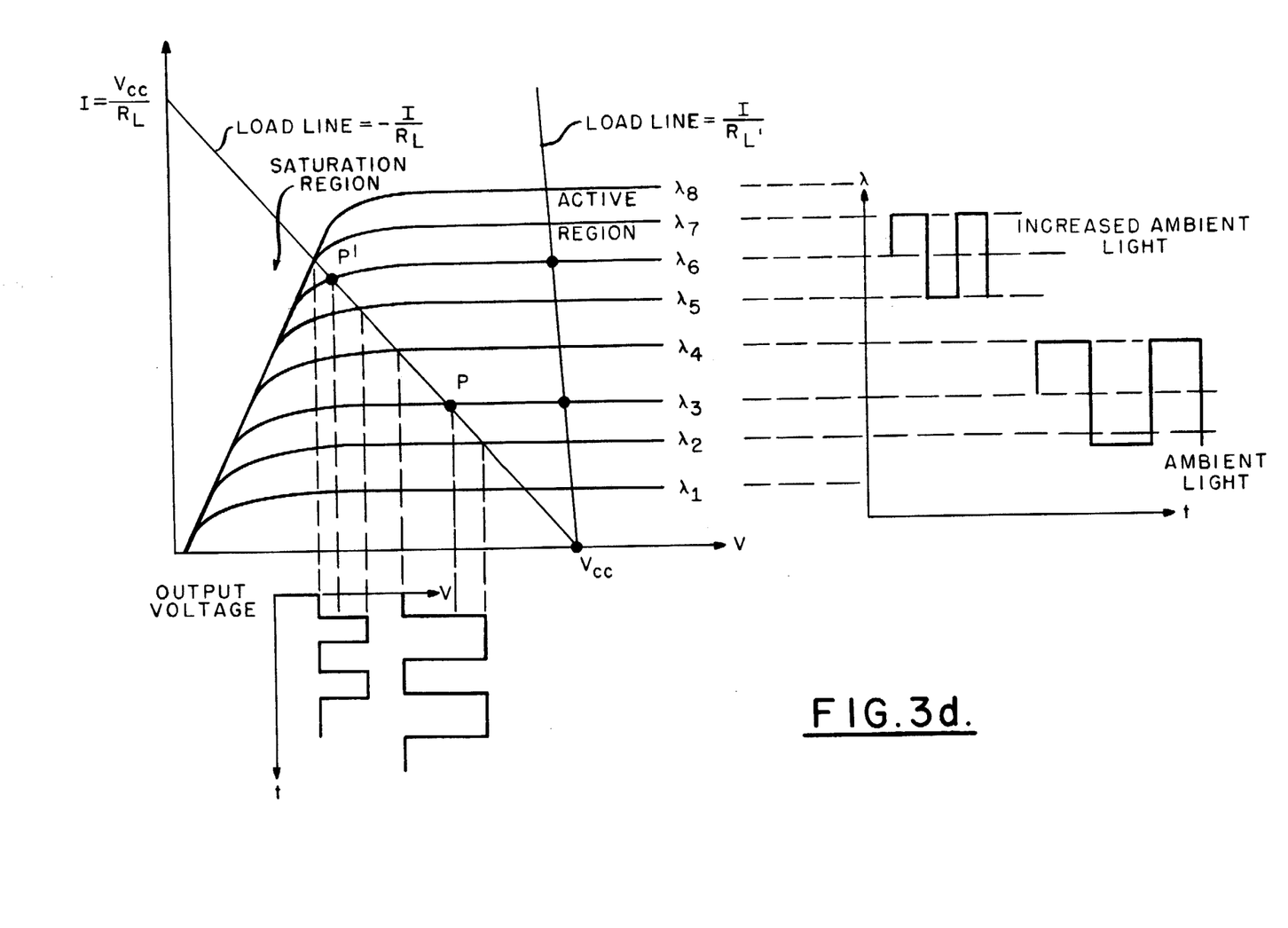
FIG. 3D is a graph useful in explaining the operation of the phototransistor included in FIGS. 3 and 3A.

This current-to-voltage converter function is depicted as function block 47 in FIG. 3. The secondary winding of transformer 49 is lightly loaded by the high impedance buffer amplifier 43 and this enhances the voltage step-up effect. This use of the transformer 49 also takes advantage of the inherent winding-to-winding capacitance found in transformers which causes a resonant peak in the frequency response of the transformer. The a.c. equivalent circuit depicted in FIG. 3C describes the resonance as a parallel-tuned circuit connected across the secondary of an ideal transformer which is, in effect, a bandpass filter. Thus, the function block 48 in FIG. 3 is depicted as a bandpass filter, and its function is preferably performed by the transformer 49. Furthermore, it is desirable to have the center frequency of the bandpass filter, i.e., the transformer 49, tuned to the transmitter's 66 fundamental frequency which is associated with the square wave modulator signal applied to the light emitting diode 65. It should also be appreciated, that the resonance frequency may be further controlled by the addition of external capacitance coupled across the secondary winding of the transformer 49, by including a capacitor 50 as shown in FIG. 3A.

Referring again to FIG. 3, it can be seen that the output of the bandpass filter 48 may then drive the buffer amplifier 43. The buffer amplifier 43 which is coupled to a second bandpass filter 45 preferably includes a second transformer whose secondary winding is also tuned to the resonance of the transmitter's 66 fundamental frequency. The output of the second transformer may then drive a full wave rectifier 46. The full wave rectifier 46 preferably includes a diode bridge, and the filtered output of the full wave rectifier is applied to a fixed threshold comparator circuit 54. The comparator circuit 54 is coupled to a second comparator circuit 53 via a differentiator circuit 52. The output signal of the comparator circuit 53 is the pulsed output signal of the optical receiver 56.

The pulsed output signal of the optical receiver 56 is coupled to a logic means 86 having left coincidence gates 84 and right coincidence gates 85. The logic means 86 is also coupled to an offset control unit 69, hereinafter described, and a position detector 87. The position detector 87 includes light sources 70, 71 which are paired respectively with phototransistor means 72, 73. The rotating timing disk 21 is interposed between the light sources 70, 71 and the phototransistor means 72, 73 and cooperates therewith to generate left or right direction output signals and dead zone output signals. Selected direction output signals of the phototransistor means 72 are applied to inverter means 74, and dead zone output signals from the phototransistor means 73 are applied to inverter means 75. The non-selected direction output signals of the phototransistor means 72, the output signals of the inverter means 74, and the output signals of the inverter means 75 are applied to the logic circuitry 86. The left coincidence gates 84 contained within the logic circuitry 86 are coupled to a monostable multivibrator 80, and the right coincidence gates 85 also contained within the logic circuitry 86, are coupled to a monostable multivibrator 81. The monostable multivibrator 80 is coupled to a left control relay 90 via a relay driver 82. The monostable multivibrator 81 is coupled to a right control relay 91 via a relay driver 83. The left control relay 90 and the right control relay 91 are coupled to a spout drive motor 92 which is a bi-directional D.C. motor.

Figure 4:
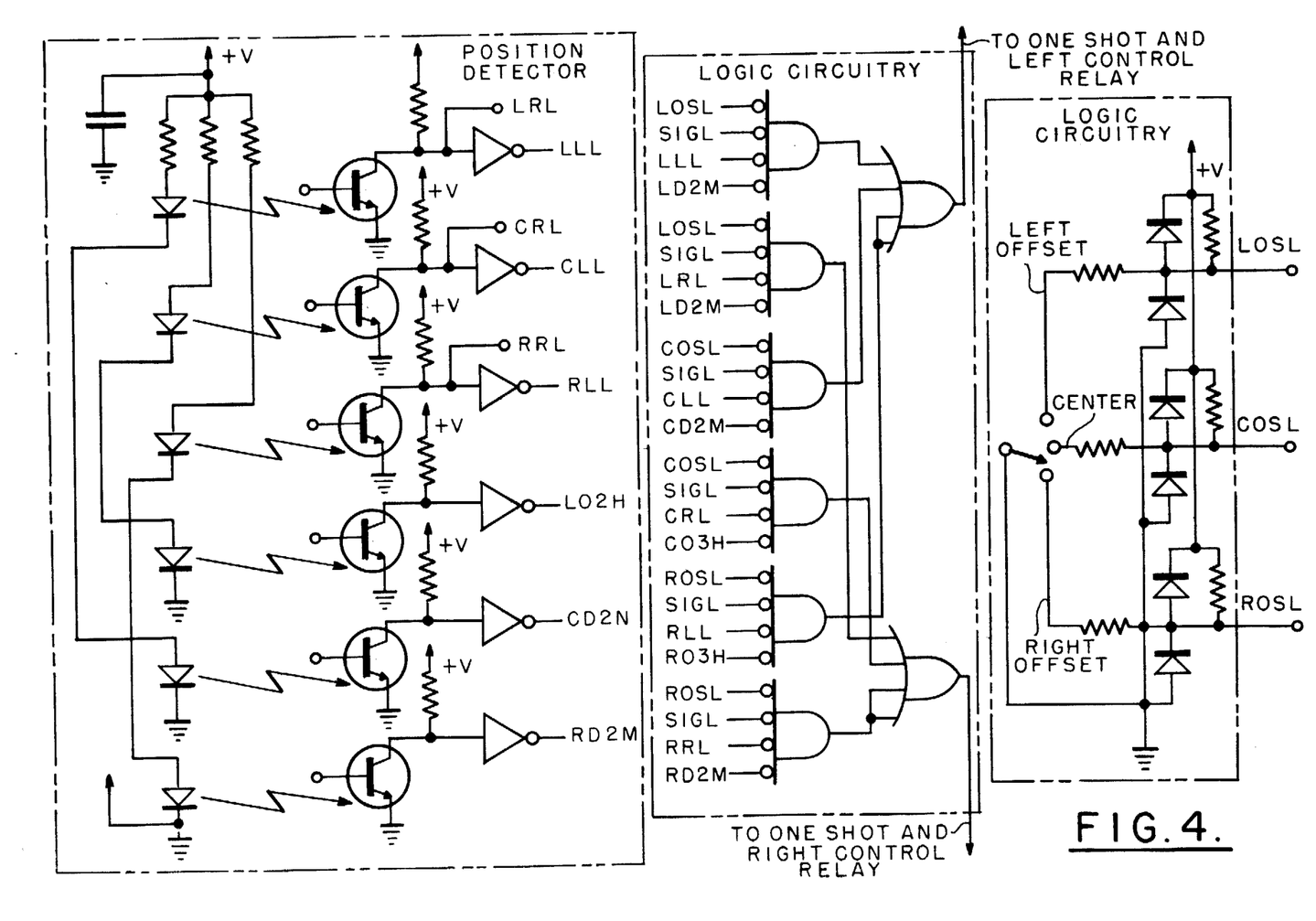
FIG. 4 is a schematic diagram of a position detector and logic means associated therewith in the preferred embodiment.

Referring now to FIG. 4, a schematic diagram depicts the position detector 87, the logic circuitry 86, and the offset control unit 69 interconnected to provide a left control signal and a right control signal. The light source 70 is comprised of the light emitting diodes 70a, 70b, and 70c which are coupled between a voltage source 62 and a ground 63. The light source 71 is comprised of the light emitting diodes 71a, 71b, and 71c which are coupled between the voltage source 62 and the ground 63. The light waves emitted from the light emitting diodes 70a, 70b and 70c either strike an opaque portion of the timing disk 21 or strike phototransistor means 72. The phototransistor means 72 is comprised of phototransistors 72a, 72b and 72c, and the selective activation of phototransistors 72a, 72b, and 72c generates left or right direction signals representative of the relative angular position of the spout and the timing disk 21. Light emitted from the light emitting diodes 71a, 71b, and 71c either strikes the opaque portion of the timing disk 21 or passes through the transparent portion of the timing disk 21 to actuate the phototransistor means 73. Phototransistor means 73 is comprised of phototransistors 73a, 73b and 73c and the selective activation of either the phototransistors 73a, 73b, or 73c generates a dead zone signal indicating alignment of the spout with the passive target as hereinafter described. The output signals of the phototransistors 72a, 72b, and 72c are applied directly to the logic circuitry 86 and indirectly to the logic circuitry 86 via the inverter means 74 which is comprised of inverter 74a, 74b, and 74c. The output signals of the phototransistors 73a, 73b, and 73c are applied to the logic circuitry 86 via the inverting means 75 comprised of inverters 75a, 75b, and 75c. The logic circuitry 86 is comprised of AND gates 76a, 76b, and 76c; AND gates 77a, 77b, and 77c; OR gate 78; and OR gate 79. The output terminal of the OR gate 78 provides the left control signal and the input terminals of the OR gate 78 are coupled to the output terminals of AND gates 76a, 76b, and 76c. The lettered input terminals of AND gates 76a, 76b and 76c are coupled to the respective lettered output terminals of the position detector 87 and the offset control unit 69 as depicted in FIG. 4. The output terminal of the OR gate 79 provides the right control signal, and the input terminals of the OR gate 79 are coupled to the output terminals of the AND gates 77a, 77b, and 77c. The lettered input terminals of AND gates 77a, 77b, and 77c are coupled to the respective lettered output terminals of the position detector 87 and the offset control unit 69 as depicted in FIG. 4. The offset control unit 69 includes manually controlled switching means 68 coupled to a circuit comprised of diodes and resistors coupled between a voltage source 62a and a ground 63a as depicted in FIG. 4, for generating an output signal to displace the discharge spout away from exact alignment with the passive target by an offset angle $\theta$. The output signals of the offset control unit 69 are applied to the logic circuitry 86.

Figure 5:
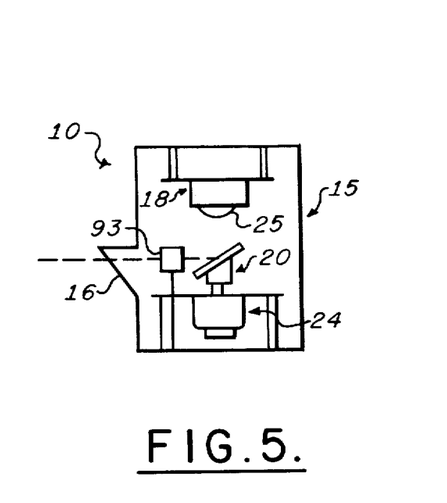
FIG. 5 illustrates a sectional view of a further embodiment of the present invention.
Figure 5A:
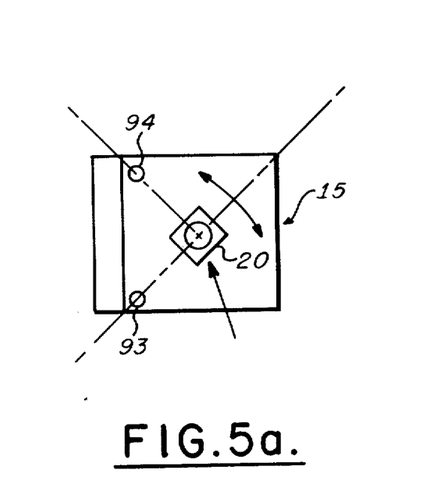
FIG. 5A is a plan view of the further embodiment of the present invention.

Referring now to FIGS. 5 and 5A, a further embodiment of the present invention is illustrated. FIG. 5 illustrates a sectional view of the further embodiment, and FIG. 5A illustrates a plan view of the further embodiment. The further embodiment of the present invention includes phototransistors 93, 94 and associated logic circuitry which act as a position detector. Referring back to FIG. 2 and FIG. 2A, it can be seen that the preferred embodiment includes a timing disk 21, light sources 70 and 71, and phototransistor means 72 and 73. Referring again to FIGS. 5 and 5A, the photodetector comprised of phototransistors 93 and 94 obviates the need for the position detector illustrated in FIG. 2 having the timing disk 21, the light sources 70 and 71, and the phototransistor means 72 and 73.

Figure 6:
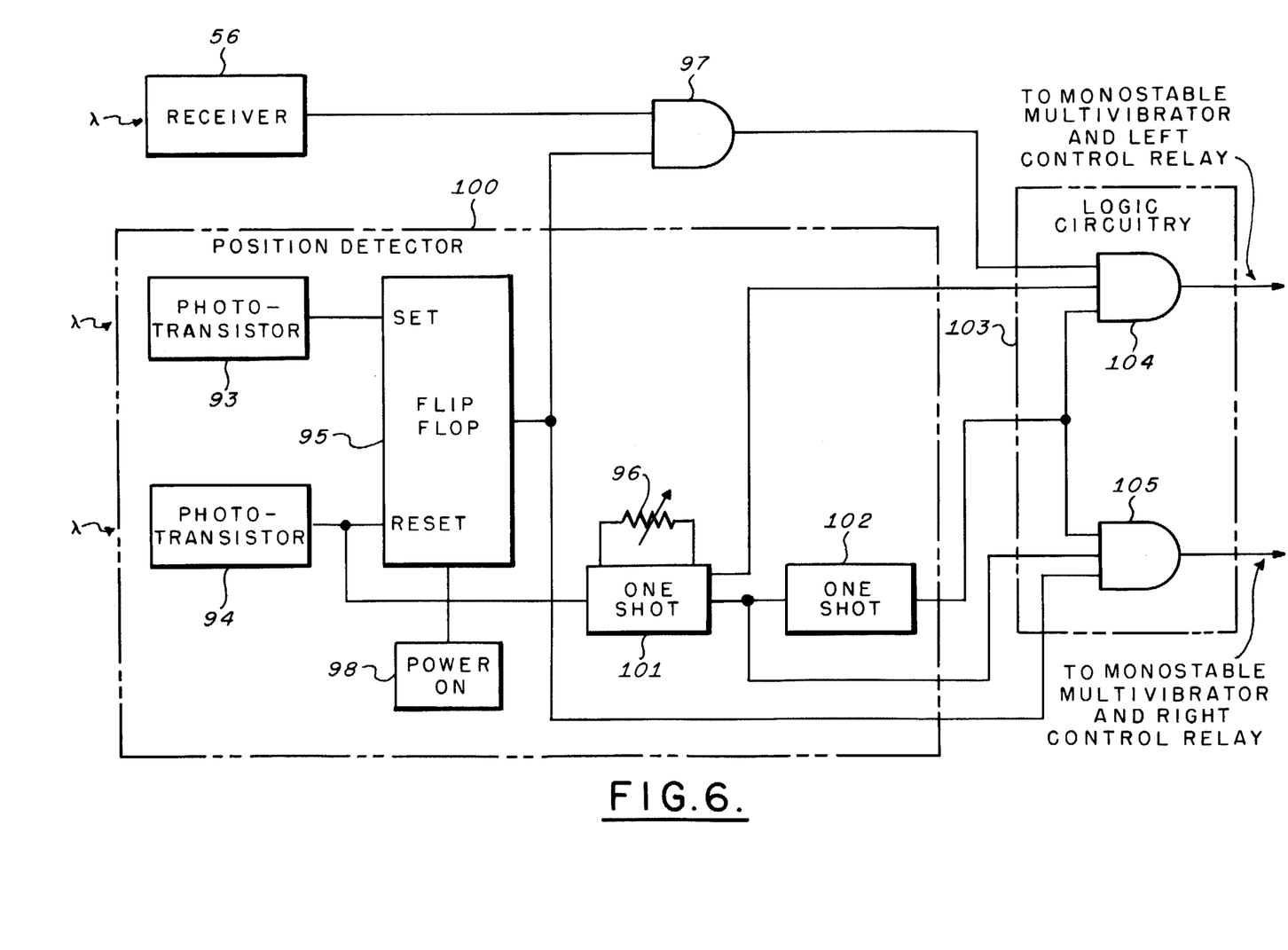
FIG. 6 is a functional block diagram of the electronic circuitry utilized in the further embodiment.

Referring now to FIG. 6, a functional block diagram of the electronic circuitry in the further embodiment is depicted. The pulsed output signal of the optical receiver 56 is applied to an AND gate 97 which receives an input signal from a position detector 100 and is coupled to logic circuitry 103. The position detector 100 includes phototransistors 93, 94 whose output terminals are coupled to a flip-flop 95. The reset terminal of the flip flop 95 is coupled to an initialization circuit 98 which resets the flip-flop on initial application of power in a manner well known in the art. The output of the flip-flop 95 is applied to a monostable multivibrator 101 which is coupled to the potentiometer 96. The potentiometer 96 adjusts the delay time of the monostable multivibrator 101 to provide an offset angle capability functionally equivalent to the capability provided by the offset control unit 69 as depicted in FIGS. 3 and 4. The monostable multivibrator 101 is coupled to a second monostable multivibrator 102 and the logic circuitry 103. The second monostable multivibrator 102 is also coupled to the logic circuitry 103. The logic circuitry 103 includes AND gates 104 and 105 and it is coupled to the control relays 82, 83 via the monostable multivibrators 80, 81 in the same manner as depicted in the preferred embodiment, FIG. 3.

Figure 7:
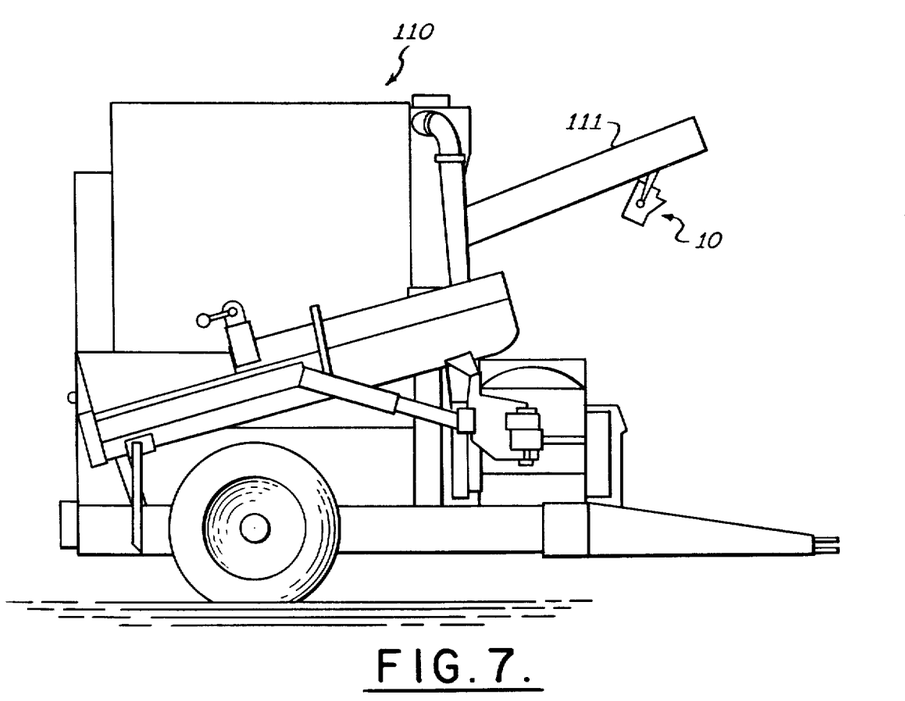
FIG. 7 is an illustration of a grinder-mixer having an unloading auger and adapted for use with the present invention.
Figure 8:
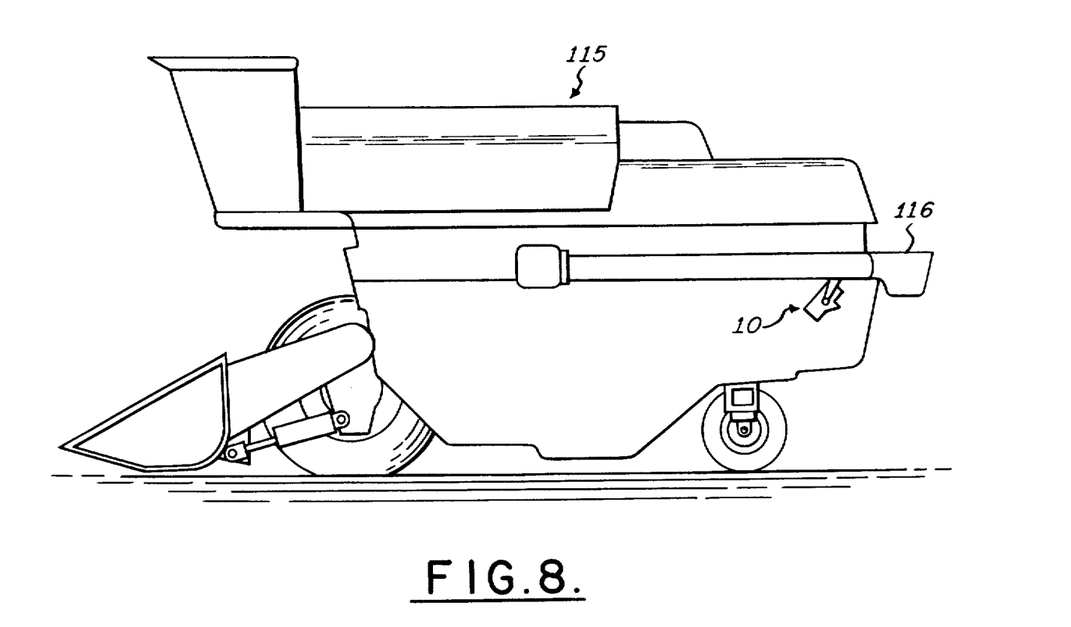
FIG. 8 is an illustration of a combine having an unloading auger and adapted for use with the present invention.

Referring now to FIGS. 7 and 8, illustrations of other typical agricultural machines having discharge spouts and adaptable for use with the present invention are provided. FIG. 7 illustrates a grinder-mixer 110 having an unloading auger 117 and the electro optical device 10 mounted thereon. FIG. 8 illustrates a combine harvester 115 having an unloading auger 116 and the electro optical device 10 mounted thereon. FIG. 1, FIG. 7, and FIG. 8 illustrate three types of agricultural machinery adaptable for use with the present invention, but it should be noted that any machine having a discharge spout may be adaptable for use with the present invention.

Referring back to FIG. 1, it can be seen that the electro optical device 10 is affixed to the crop discharge spout 12 wherefrom an infrared signal is emitted, scanning a circular sector in the general vicinity of the retroreflective target 11. Whenever the optical signal strikes the retroreflective target 11, the optical signal is reflected back towards the electro optical device 10. Referring again to FIG. 2, it can be seen that the retroreflected optical signal reenters the electro optical device 10 through the viewing window 16, strikes the rotating reflective surface 20, and causes the lens element 25 to collect a burst of the retroreflected optical energy which the optical receiver utilizes to generate a pulsed output signal. Simultaneously, the relative angular position of the rotating mirror with respect to the fixed, radially oriented light sources 70, 71 and the phototransistor means 72, 73, is determined by means of the timing disk 21. Since the boundary of the transparent portion 31 and the opaque portion 32 of the timing disk 21 may be defined as the center of the rotating reflector surface 20, the relative angular position of the comparison points 33, 34, and 35, causes the electronic circuitry coupled to the light sources 70 and the associated phototransistor means 72, to generate a left or right direction signal. Switching about the comparison points 33, 34 and 35, however, should be inhibited to prevent the generation of direction signals which would cause the discharge spout to oscillate whenever relative alignment of the spout and the comparison point occur. The transparent sections 25a, 26 and 27 of the timing disk 21 and the light sources 70 and the phototransistor 73, therefore, may be used to minimize the undesired oscillation of the discharge spout. When light from the light source 71 passes through the transparent sections 25a, 26, or 27 the phototransistor means 73 is activated and a dead zone is generated which disables the receiver circuitry from sending a direction signal via the control relays 90, 91 to the spout motor 92 as shown in FIG. 3.

Referring again to FIG. 4, it can be seen that when the timing disk 21 has three comparison points and three transparent dead zone sections, six light sources 70a, 70b, and 70c and 71a, 71b, and 71c with their associated phototransistors 72a, 72b, and 72c and 73a, 73b, and 73c should be utilized. Consequently, logic circuitry 86 should include six AND gates 76a, 76b, 76c, 77a, 77b, and 77c which are all connected to the optical receiver by means of the lettered input terminal designated SIGL. The remaining lettered input terminals of the AND gate terminals 76a, 76b, 76c, 77a, 77b, and 77c are coupled to the lettered output terminals of the position detector 87 and the offset control unit 69 as depicted in FIG. 4. The AND gates are grouped into the left AND gates which are AND gates 76a, 76b, and 76c and the right AND gates which are AND gates 77a, 77b and 77c. All the AND gates, however, each have four input terminals. One input terminal on each AND gate is coupled via the lettered terminal SIGL to the optical receiver 56; one input terminal on each AND gate is coupled to the offset control unit 69; one input terminal on each AND gate is coupled to the appropriate inverter 75a, 75b, or 75c for receiving a dead zone signal; and one input terminal on each AND gate is coupled to either the phototransistor 72a, 72b, 72c or the inverter 74a, 74b, 74c for receiving a direction signal. Thus, an output signal is not present at the output terminals of the AND gates 76a, 76b, 76c, 77a, 77b, or 77c unless all four input terminals of that particular AND gate are pulsed HIGH. The output signals of the AND gate 76a, 76b, and 76c are applied to the left monostable multivibrator via the OR gate 78. The output signals of the AND gates 77a, 77b, and 77c are applied to the right monostable multivibrator via the OR gate 79.

Referring again to FIG. 3, it can be seen that the output signals from the OR gates 78, 79 contained within the logic circuitry 86 are applied to the monostable multivibrators 80, 81 respectively. Upon receipt of a pulse from the logic circuitry 86, the monostable multivibrators 80, 81 remain triggered for approximately one second, thereby preventing signal fluctuations and drop outs less than one second in duration, from causing an interruption in the control signals applied to the spout drive motor 92 via the spout control relays 90 and 91. It should be appreciated, however, that the triggered interval for monostable multivibrators 80, 81 may be adjusted to accommodate other conditions. The control relays 90, 91, the spout drive motor 92 and the appropriate gearing (not shown) which couple the spout drive motor to the spout are well known in the art and similar to those disclosed in U.S. Pat. No. 4,042,132.

Referring now to FIG. 5, a further embodiment of the present invention is illustrated wherein a position detector including the phototransistors 93, 94 replaces the position detector 87 having the timing disk 21 with its associated electronic circuitry as depicted in FIG. 2. The phototransistors 93, 94 are disposed within the electro optical device 10 at the edges of the viewing window 16. Referring now to FIG. 6, it can be seen that when the phototransistor 93 disposed at the leading edge of the viewing window 16 is illuminated by the scanning beam, it generates a start pulse which enables the optical receiver 56 and the delay monostable multivibrator 101. The potentiometer 96 is manually adjustable, and it controls the delay time of the monostable multivibrator 101. This manually adjustable delay time provides the apparatus with an offset capability which permits the discharge spout to be adjusted relative to its alignment with the passive target means by an offset angle θ.

This offset adjustment provides capability to more precisely center the crop discharge into the collector vehicle, but may be used to intentionally alter this alignment to achieve a better distribution of material in the collector vehicle. A manual control may be provided to allow periodic adjustments for the above reasons, or an automatic readjustment may be applied to produce a periodically altering position programmed in a specific manner. For example, it may be desired that the collector vehicle be loaded in a prescribed manner (i.e., first the front, then the back in a side loading situation). In this case a preprogrammed offset might be included which would affect such an operation. In like manner, it may be desired to slowly dither the discharge spout to achieve a better side to side distribution for a trail collector vehicle.

Accordingly, at the conclusion of the delay time of the manually adjusted potentiometer 96 or offset control device, the monostable multivibrator 102 is triggered. The output pulse of the monostable multivibrator 102 is applied to the control logic circuitry 103, and functions as a dead zone signal. When the optical scanning signal illuminates the phototransistor 94 disposed at the trailing edge of the viewing window 16, the optical receiver 56 is disabled. The output signals from the optical receiver 56, monostable multivibrator 101, and the monostable multivibrator 102 are all applied to the AND gates 104 and 105 as depicted in FIG. 6. Thus, a left or right control signal is present at the output terminals of AND gates 104 and 105, respectively, dependent upon the point in time when the optical signal strikes the retroreflective target and is sensed by the optical receiver 56. Switching the optical receiver 56 on and off only when the scanning optical signal passes through the viewing window, moreover, allows for greater sensitivity of the optical receiver 56. This greater sensitivity of the optical receiver 56 is achieved as a result of the internal reflections from the optical beam being disregarded by the optical receiver 56 as it sweeps through the interior portion of the electro optical device 10. Implementation of the further embodiment, however, may require that the speed of the scanning motor 24 in FIG. 5 be more carefully regulated in the further embodiment than in the preferred embodiment due to fluctuations in the supply voltages commonly associated with agricultural machinery.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus for automatically controlling the direction of a crop discharge spout of an agricultural machine with respect to a collector vehicle associated therewith, comprising:
   first means affixed to said discharge spout, for transmitting and receiving an optical signal;
   a rotating reflective surface cooperating with said first means to scan a selected area with said optical signal;
   passive target means affixed to said associated collector vehicle for reflecting said optical signal whereby said first means provides output signals in response to optical signals reflected from said passive target means;
   second means coupled to said first means for generating control signals when said first means receives a reflected optical signal from said passive target means; and
   utilization means coupled to said discharge spout and responsive to said control signals for aligning said discharge spout with said collector vehicle, such that crop discharge is continuously directed into said associated collector vehicle.

2. Apparatus for automatic spout control according to claim 1 wherein said first means includes optical receiver means having lens means aligned with said rotating reflective surface and cooperating therewith, such that a pulsed output signal is generated when said first means receives the reflected optical signal which irradiates said passive target means.

3. Apparatus for automatic spout control according to claim 2 wherein said second means includes a position detector having a timing disk operatively coupled to said rotating mirror and associated photosensor means cooperating therewith, for providing direction signals and dead zone signals.

4. Apparatus for automatic spout control according to claim 2 wherein said second means includes a position detector, having a plurality of phototransistors disposed at the edges of the scanning area irradiated by said optical signal and coupled to means for switching said optical receiver means, for providing direction signals and dead zone signals.

5. Apparatus for automatic spout control according to claim 3 or 4 wherein said second means includes an offset control means for providing an offset angle signal.

6. Apparatus for automatic spout control according to claim 5 wherein said second means includes logic means responsive to said position detector, said receiver means, and said offset angle control means such that the output signals of said logic means are applied to said utilization means as said control signals.

7. Apparatus according to claim 6 wherein said offset angle means includes means for manually adjusting the distribution of the discharged crop material within said associated collector vehicle.

8. Apparatus according to claim 6 wherein said offset angle means includes programming means for adjusting the distribution of crop material within said associated collector vehicle in a prescribed manner.

9. Apparatus for automatic spout control according to claim 5 wherein said utilization means includes a bidirectional d.c. motor responsive to said control signal and coupled through appropriate gearing to said discharge crop spout.

10. Apparatus for automatic spout control according to claim 9 wherein said passive target means includes at least one retroreflector having a plurality of perpendicular reflective surfaces.

* * * * *